(12) United States Patent
Uehara et al.

(10) Patent No.: US 7,756,097 B2
(45) Date of Patent: Jul. 13, 2010

(54) RAPID PUSH-TO-SEND DATA EXCHANGE METHOD AND APPARATUS

(75) Inventors: Glen S. Uehara, Gilbert, AZ (US); Valentin M. Bustamante, Gilbert, AZ (US); Keith M. Klug, Gilbert, AZ (US); Fred R. Villa, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 1020 days.

(21) Appl. No.: 11/312,989

(22) Filed: Dec. 19, 2005

(65) Prior Publication Data

US 2007/0140205 A1    Jun. 21, 2007

(51) Int. Cl.
*H04B 7/216* (2006.01)

(52) U.S. Cl. ....................................... 370/342
(58) Field of Classification Search ............... 370/342; 455/466
See application file for complete search history.

(56) References Cited

U.S. PATENT DOCUMENTS

| | | | |
|---|---|---|---|
| 2002/0155848 A1* | 10/2002 | Suryanarayana | 455/466 |
| 2004/0121791 A1 | 6/2004 | May et al. | |
| 2004/0203469 A1* | 10/2004 | Patel et al. | 455/67.14 |
| 2004/0218555 A1 | 11/2004 | Chen et al. | |
| 2004/0219940 A1 | 11/2004 | Kong et al. | |
| 2005/0014506 A1 | 1/2005 | Thorson et al. | |
| 2005/0164682 A1 | 7/2005 | Jenkins et al. | |
| 2005/0188424 A1 | 8/2005 | Kisyma | |
| 2006/0189337 A1* | 8/2006 | Farrill et al. | 455/518 |

* cited by examiner

*Primary Examiner*—Patrick N Edouard
*Assistant Examiner*—Eric J Elcenko
(74) *Attorney, Agent, or Firm*—Guntin Meles & Gust, PLC; Pablo Meles

(57) ABSTRACT

A system (20) and method (50) of establishing a rapid push-to-send data exchange in a multi-wireless network environment can include a first wireless network (24 and 26) having a fast network channel to exchange an Internet Protocol (IP) address or other data, a second wireless network (23 and 27) operatively coupled to the first wireless network having a high bandwidth data channel to exchange data using the IP address in a wireless peer to peer data transfer, and a communication protocol. The first wireless network can be an iDEN network and the second wireless network can be a CDMA network. The communication protocol can relinquish (66) communication using the first wireless network once a dedicated data channel on the second wireless network is established. The communication protocol can also simultaneously transfer (56) voice traffic on the first network when the first network is exchanging the IP address.

15 Claims, 5 Drawing Sheets

| LOG Time | Description | Relative Time (seconds) |
|---|---|---|
| 18:31:25.714 | first indication of call starting | 0.000 |
| 18:31:27.632 | CDMA modem going to Update Ovrhd Info State | 1.918 |
| 18:31:27.667 | CDMA modem going to Origination Attempt State | 1.953 |
| 18:31:28.512 | CDMA modem going to Traffic Channel Init State | 2.798 |
| 18:31:28.987 | CDMA modem going to Conversation State | 3.273 |

FIG. 2

| LOG Time | Description | Relative Time (seconds) |
|---|---|---|
| 18:31:25.714 | first indication of call starting | 0.000 |
| 18:31:27.632 | CDMA modem going to Update Ovrhd Info State | 1.918 |
| 18:31:27.667 | CDMA modem going to Origination Attempt State | 1.953 |
| 18:31:28.512 | CDMA modem going to Traffic Channel Init State | 2.798 |
| 18:31:28.987 | CDMA modem going to Conversation State | 3.273 |

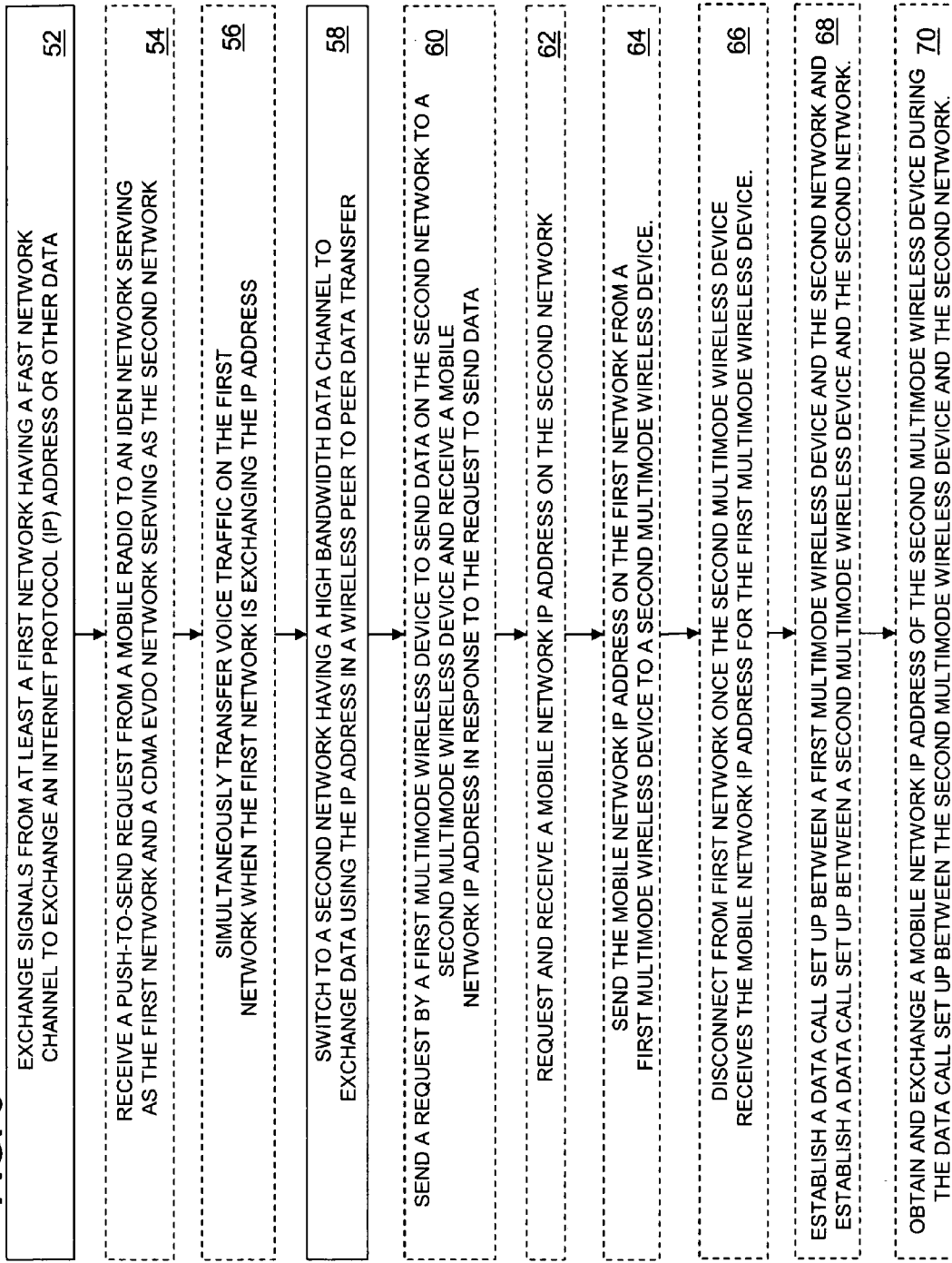

RAPID PUSH-TO-SEND DATA EXCHANGE METHOD AND APPARATUS

FIELD OF THE INVENTION

This invention relates generally to mobile packet data networks, and more particularly to a method and system for rapid push-to-send data exchange.

BACKGROUND OF THE INVENTION

In wireless communication systems mobile units or devices are required to operate on batteries and these mobile units will go inactive (or dormant) on the radio frequency (RF) channels after a short period of inactivity of usage for data services, usually 30 to 60 seconds. Therefore, in push-to-talk calls using the wireless data services, both the originating and terminating mobile units must be transitioned to the active state (actually using RF resources) as part of the call setup prior to enabling the push-to-talk function. Once a mobile unit is in the active state, an RF channel has been established and the mobile unit is able to transmit and/or receive data. As known in the art, push-to-talk call applications include transmission of voice and associated signaling data, but advances in packet data networks extend push-to-talk call applications to include images, streaming video, text messaging, stored audio files, and other multi-media.

For typical push-to-talk call applications, the time required for transitioning an originating mobile unit from a dormant state to the active state can be greater than 3 seconds in current implementations. An equal or greater amount of time is required to transition the terminating mobile unit from the dormant to active state, including additional time to actually page the mobile device, as is known in the art. These times do not include transmission time over the air or call processing time required by the dispatch servers. As a result, for the push-to-talk function total delay times experienced by the originating mobile unit may be 10 seconds or greater.

With long call setup times, the advantages of the push-to-talk service as an instant communications method is diminished particularly with call setup times of 8 seconds or even longer which can make the service non-viable in the marketplace. For example, users would prefer to use cellular, rather than holding down the PTT button.

A similar problem exists for group calls in the push-to-talk mode. Call setup times may be even longer since there is a number of terminating mobile units to connect to the originating mobile unit. Although some of the processing time for each of the terminating or target mobile units may overlap, the total call setup time is likely to be even greater than the individual-to-individual call. Therefore, group calls pose an even greater problem for the push-to-talk function in a packet data network.

Accordingly, with phones starting to include capabilities to store and transfer higher bandwidth forms of data such as music, voice, video, images and other forms of multimedia, existing methods of wireless protocols or techniques fail to provide users with an almost instantaneous communication session or "feel" when exchanging such high bandwidth information among users as currently experienced among users of interactive messaging.

SUMMARY OF THE INVENTION

Embodiments in accordance with the present invention provide users with a peer to peer data transfer scheme that can enable exchange of high bandwidth data such as music, voice, video or other forms of multimedia over a wireless network that can provide an instant messaging-like experience.

In a first embodiment of the present invention, a method of rapid push-to-send data exchange in a multi-wireless network environment can include the steps of exchanging signals from at least a first network having a fast network channel to exchange an Internet Protocol (IP) address or other data and switching to a second network having a high bandwidth data channel to exchange data using the IP address in a wireless peer to peer data transfer. The method can further include the steps of sending a request by a first multimode wireless device to send data on the second network to a second multimode wireless device and receiving a mobile network IP address in response to the request to send data. The method can further include the step of requesting and receiving a mobile network IP address on the second network and sending the mobile network IP address on the first network from a first multimode wireless device to a second multimode wireless device. The method can disconnect from first network once the second multimode wireless device receives the mobile network IP address for the first multimode wireless device. The method can also establish a data call set up between a first multimode wireless device and the second network and establish a data call set up between a second multimode wireless device and the second network. In one aspect, a mobile network IP address of the second multimode wireless device can be obtained and exchanged during the data call set up between the second multimode wireless device and the second network. Although embodiments are not limited to particular networks, in one embodiment, the step of exchanging signals from at least the first network can be done by receiving a push-to-send request from a mobile radio to an iDEN network serving as the first network and a CDMA network serving as the second network. More specifically, the CDMA network can be a CDMA EVDO network. Note, the method can also simultaneously transfer voice traffic on the first network when the first network is exchanging the IP address.

In a second embodiment of the present invention, a system of establishing a rapid push-to-send data exchange in a multi-wireless network environment can include a first wireless network having a fast network channel to exchange an Internet Protocol (IP) address or other data, a second wireless network operatively coupled to the first wireless network having a high bandwidth data channel to exchange data using the IP address in a wireless peer to peer data transfer, and a communication protocol. The communication protocol can be among an originating mobile subscriber unit, a target mobile subscriber unit, the first wireless network, and the second wireless network so that the first wireless network and the second wireless network receive a request for a fast paging network connection to transfer the IP address for use by the second wireless network in the wireless peer to peer data transfer. Optionally, the system can include a push-to-send server operatively coupled to the first wireless network and the second wireless network that stores the IP address. The first wireless network can be an iDEN network and the second wireless network can be a CDMA network as described above.

Operationally, the communication protocol can relinquish communication using the first wireless network once a dedicated data channel on the second wireless network is established using the high bandwidth data channel. The communication protocol can further exchange setup traffic between the originating mobile subscriber unit and the second network substantially in parallel to when the originating mobile subscriber unit sends a push-to-send or page request to the first network. The communication protocol can further exchange setup traffic between the target mobile subscriber unit and the second wireless network immediately after the first wireless network informs the target mobile subscriber of the IP address for the originating mobile subscriber unit. The communication protocol can also receive setup traffic between the originating mobile subscriber unit and the second wireless network and between the target mobile subscriber unit and the second wireless network substantially in parallel or simultaneously. Note, the communication protocol can also simultaneously transfer voice traffic on the first network when the first network is exchanging the IP address.

In a third embodiment in accordance with the present invention, a mobile wireless device having a rapid push-to-send data exchange function in a multi-wireless network environment can include a first transceiver operating on a first wireless network having a fast network channel to exchange an Internet Protocol (IP) address or other data, a second transceiver operating on a second wireless network having a high bandwidth data channel and operatively coupled to the first wireless network to exchange data using the IP address in a wireless peer to peer data transfer, and a processor coupled to the first transceiver and the second transceiver. The processor can be programmed to exchange signals on the first network to exchange the IP address and switch to the second network using the IP address to transfer data in the wireless peer to peer data transfer. The data transferred on the second network can be image, video, sound recording, or multimedia data for example.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 2 is an illustration of timing of a CDMA2000 1X system logging two CDMA phones with PTT capability.

FIG. 5 is a flow chart illustrating a method of rapid push-to-send data exchange in a multi-wireless network environment in accordance with an embodiment of the present invention.

DETAILED DESCRIPTION OF THE DRAWINGS

Figure 1:
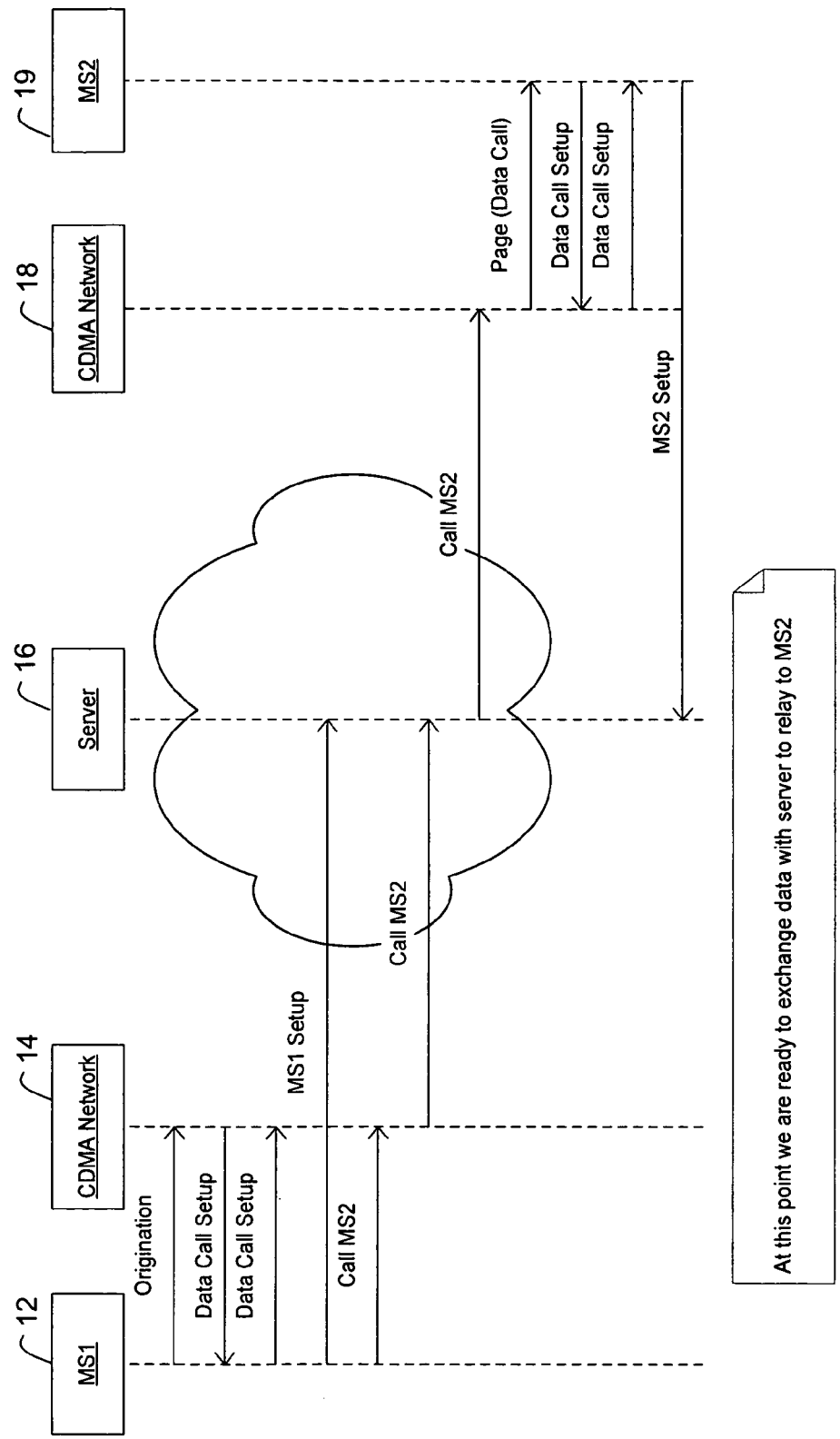
FIG. 1 is an illustration of an existing communication protocol for setting up a push-to-send data call session.

While the specification concludes with claims defining the features of embodiments of the invention that are regarded as novel, it is believed that the invention will be better understood from a consideration of the following description in conjunction with the figures, in which like reference numerals are carried forward.

Embodiments herein can optimize a user's experience for sending data via a Push-to-Send or Push-to-X (PTx) function. The Push-to-X function can transfer data such as stored music, voice, video, images, multimedia data or other data. This data can be transferred from mobile to mobile directly without necessarily using a server or store and forward scheme as found in the existing art. For a multi-mode handset, embodiments herein can decrease the call-setup time for data channel setup (e.g. CDMA network) by using a faster paging network (e.g. iDEN network or CDMA short data burst). Additionally, embodiments herein can exchange IP (and other information for connection) by using either a data over voice on one network (such as the data capability on a voice channel on the iDEN network) or by sending a short data burst. This transferring of IP can avoid a mobile from storing another mobile's IP (i.e. creating an entry in the phonebook) and creating further overhead and delay. Note, a server can still be used to handle the data burst or Short Data Burst channel data, but it is not necessary to store the full data information (images, video, etc) in the server.

To provide perspective how embodiments herein can provide for "instant-messaging-like" performance in terms of speed, a review of existing slower CDMA call set environments can provide additional insight. Referring to FIG. 1, a diagram for a system 10 for a typical CDMA call setup is illustrated. An originating mobile subscriber unit (MS) 12 requests a PTT call or group call, and a network 14 responds by setting up a traffic channel. The originating MS's traffic channel request eventually reaches a PTT server 16, which then pages the target MSs 19 (note, a single MS is shown—in group calls other MSs in the group are paged in parallel) using network equipment 18. The target MS 19 is paged, responds to the page, and eventually a traffic channel is assigned using network 18. At this point, a PTT call or a group call voice can be delivered to the target MSs (19). Note that the call setup for the subscribers is done in a serial fashion. Much of the delay in establishing the call is due to the serial nature of the call setup. Similar delays are experienced when exchanging data. As will be noted in FIG. 3 in an embodiment of the present invention, the CDMA traffic channel assignment of the subscribers can be done in parallel and the paging done at faster intervals providing significant savings in any setup timing.

Referring to FIG. 2, timing taken in June 2005 on a CDMA2000 1X system logging two CDMA phones with PTT capability illustrates that it takes greater than 3 seconds typical setup time for an Originating mobile to get to a traffic channel (TCH). The paging delay in CDMA2000 can be derived from the paging protocol architecture having slot cycle indexes and a predetermined formulaic paging interval. Further, once the mobile terminating (MT) device receives the page, it can take over a second to come onto a traffic channel. If the call setup time for the terminating phone could be done in parallel with the originating phone, several seconds can be eliminated from the setup time. This improvement would result in approximately 30% reduction in call setup time for this example.

Figure 3:
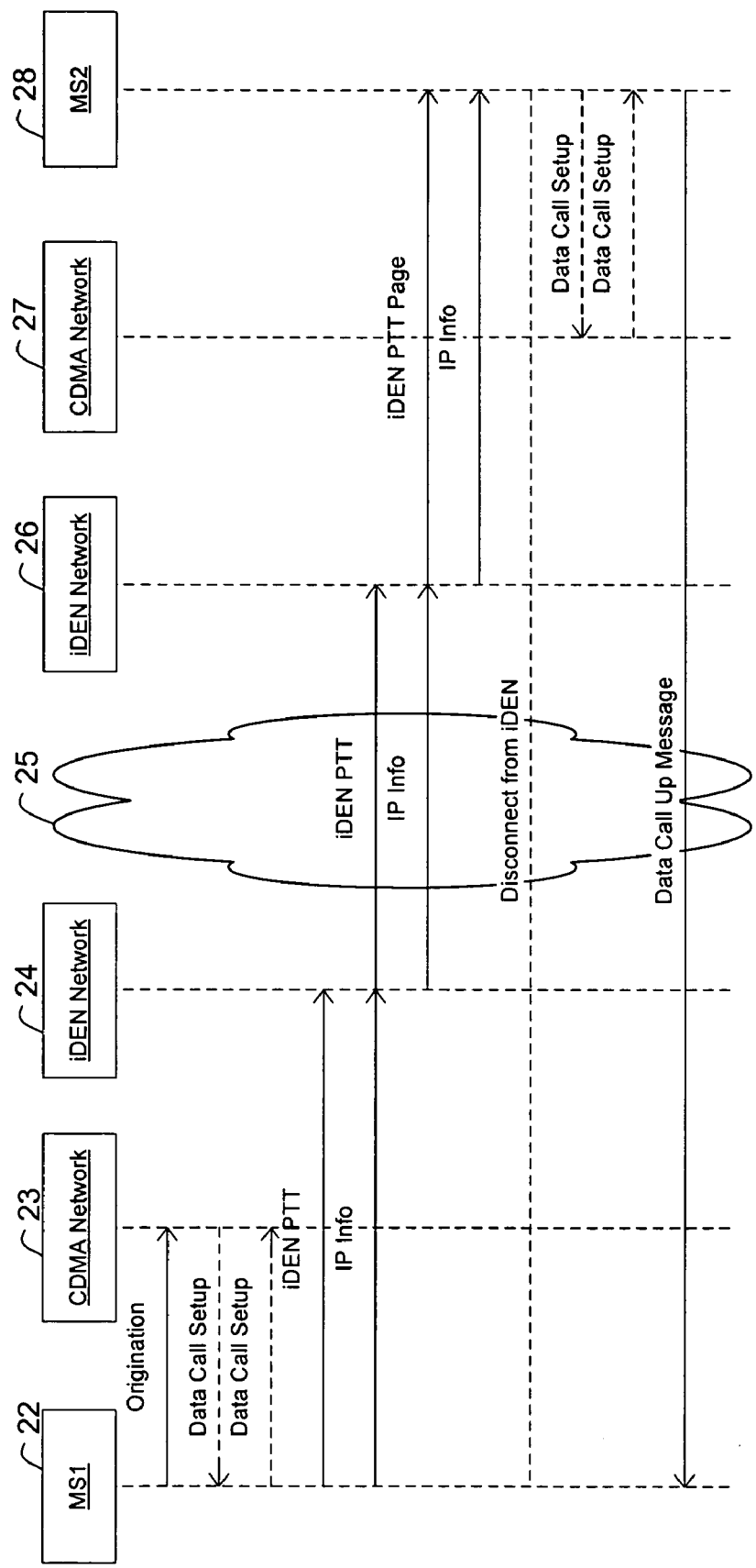
FIG. 3 is an illustration of a communication protocol for setting up a rapid push-to-send data call session in a multi-wireless network environment in accordance with an embodiment of the present invention.

Referring to FIG. 3, a diagram for a rapid push-to-send data exchange in a multi-network environment or system 20 can use a fast paging channel on one network to rapidly provide an IP address and establish a peer-to-peer data transfer or a dedicated communication channel between mobile subscriber units. A PTT barge call having an originating mobile's IP information can be used to send such information to a target subscriber unit where the data is desired to be sent.

Instead of using a server to store data and "pushing" such data using SMS or Data call page with a Data Channel, the data can be directly sent in the form of data packets to the user if the mobile IP is known. This assumes that the network and the user is allowed to send data to each other using IP only. If other data is needed in a particular system, it is contemplated within the scope of the embodiment herein.

Referring again to FIG. 3, in one particular embodiment an originating wireless device or a first mobile subscriber 22 can have data to send to a target wireless device or a second mobile subscriber 28. The user of the first mobile subscriber 22 can press a PTx or PTT button. The first mobile subscriber 22 can connect to a second network 23 (and 27) such as an EV/DO or 1x data network and optionally obtain its IP such as a mobile network IP address. The first mobile subscriber 22 can also send a page on a first network 24 (and 26) such as a fast paging network (such as an iDEN network by Motorola, Inc.) to the second subscriber unit 28. A server 25 can be used to store a database of mobile IP network addresses. Note, the server 25 would not be storing high bandwidth data such as images or video that would be exchanged among the subscriber units using a CDMA data channel for example. The second subscriber unit 28 receives the page and the first subscriber unit 22 can also send it's assigned IP address to the second subscriber unit 28 via the first network 24 and 26. The second subscriber unit 28 can connect to the second data network (23 and 27) after receiving the IP address from the first subscriber unit 22. The second subscriber unit 28 can then connect to the second data network (27 and 23) and exchange data using the higher bandwidth capabilities of the second data network. The second subscriber unit 28 can send an acknowledgement (possibly including its assigned IP address as well) over the second data network (23 and 27) before commencing a peer-to-peer data exchange. Optionally, the first and second subscriber units 22 and 28 can disconnect from the first network (24 and 26) or the iDEN network in the embodiment illustrated.

Note, in one embodiment, simultaneous voice and data information can be sent using iDEN dispatch and the CDMA data network. Simultaneous transmission of CDMA and iDEN messaging is contemplated for a dual mode CDMA/iDEN subscriber unit. Furthermore, one or more of the mobile subscribers can be tethered to a laptop, PDA to provide a means for storing Push-to-X data information that may not necessarily be handled by the mobile subscriber alone. Of course, a mobile subscriber having sufficient memory and processing power may not necessarily need to be tethered to other devices.

Using such techniques, a user's mobile communication experience can change to provide Instant-Messaging-like features for high bandwidth data packets such as images, video, or multimedia. Since both users will essentially be going up onto the data channel (23 and 27) in parallel, there will be less "wait time" for a data channel setup. In addition, the mobile's IP will not need to be known by the user and it can be transferred as part of the data channel setup. This will allow different types of IP addresses to be used by the mobile subscriber units.

Additionally, the iDEN page delivery is significantly faster than CDMA2000's comparable paging delivery. iDEN dispatch paging occurs at 90 msec intervals, vs 2.56 sec intervals (using a Slot Cycle Index of 1). Assuming an average page delivery of ½ the interval time, iDEN's 45 msec average page delay is approximately 800 msec faster than CDMA's 1.28 sec average.

Figure 4:
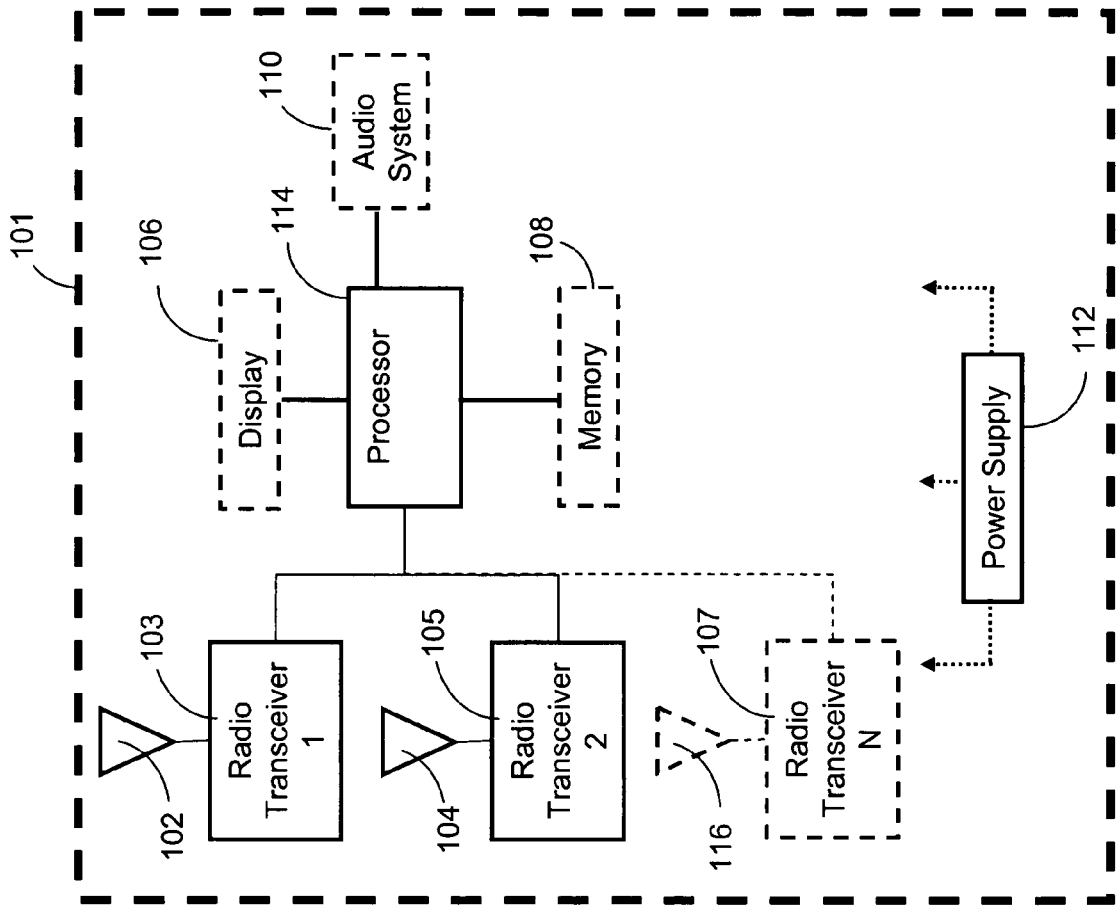
FIG. 4 is a multimode wireless transceiver device using a push-to-send data call protocol in a multi-wireless network environment in accordance with an embodiment of the present invention.

Referring to FIG. 4, a wireless device 101 such a multi-mode radio in a communication system 100 can be implemented in the form of a cellular phone, a lap top computer or a camera phone or any other electronic device. The electronic device can further include a display 106 for conveying images to a user of the device, a memory 108 including one or more storage elements (e.g., Static Random Access Memory, Dynamic RAM, Read Only Memory, etc.), an optional audio system 110 for conveying audible signals (e.g., voice messages, music, etc.) to the user of the device, a conventional power supply 112 for powering the components of the device, and a processor 114 comprising one or more conventional microprocessors and/or digital signal processors (DSPs) for controlling operations of the foregoing components.

The processor 14 can be programmed to operate as further described with respect to the flow chart of FIG. 5 and can be coupled to a plurality of transceivers (103, 105, and 107) including a first radio transceiver 103 and a second radio transceiver 105. Of course, the processor 114 can be coupled to any number of additional transceivers 107. Each of the transceivers 103, 105, and 107 can be coupled to respective antennas 102, 104 and 116. The first transceiver 103 can be an iDEN transceiver and the second transceiver can be an CDMA EVDO transceiver.

Referring to FIG. 5, a flow chart illustrating a method 50 of rapid push-to-send data exchange in a multi-wireless network environment is shown. The method 50 can include the step 52 of exchanging signals from at least a first network having a fast network channel to exchange an Internet Protocol (IP) address or other data and switching at step 58 to a second network having a high bandwidth data channel to exchange data using the IP address in a wireless peer to peer data transfer. The method 50 can further include the step 60 of sending a request by a first multimode wireless device to send data on the second network to a second multimode wireless device and receiving a mobile network IP address in response to the request to send data. The method 50 can further include the step 62 of requesting and receiving a mobile network IP address on the second network and sending at step 64 the mobile network IP address on the first network from a first multimode wireless device to a second multimode wireless device. The method 50 can optionally disconnect from first network once the second multimode wireless device receives the mobile network IP address for the first multimode wireless device at step 66. The method 50 can also establish a data call set up between a first multimode wireless device and the second network and establish a data call set up between a second multimode wireless device and the second network at step 68. In one aspect, a mobile network IP address of the second multimode wireless device can be obtained and exchanged at step 70 during the data call set up between the second multimode wireless device and the second network.

Although embodiments are not limited to particular networks illustrated, in one embodiment, the step 52 of exchanging signals from at least the first network can be done by receiving a push-to-send request from a mobile radio to an iDEN network serving as the first network and a CDMA network serving as the second network as shown in step 54. More specifically, the CDMA network can be a CDMA EVDO network. Note, the method 50 can also simultaneously transfer voice traffic on the first network at step 56 when the first network is exchanging the IP address.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of rapid push-to-send data exchange in a multi-wireless network environment, comprising the steps of:
   exchanging signals from at least a first network having a fast network channel to exchange an Internet Protocol (IP) address or other data;
   switching to a second network having a high bandwidth data channel to exchange data using the IP address in a wireless peer to peer data transfer;
   simultaneously transferring voice traffic on the first network when the first network is exchanging the IP address;
   requesting and receiving a mobile network IP address on the second network and sending the mobile network IP address on the first network from a first multimode wireless device to a second multimode wireless device; and
   disconnecting from first network once the second multimode wireless device receives the mobile network IP address for the first multimode wireless device.

2. The method of claim 1, wherein the method further comprises the step of sending a request by a first multimode wireless device to send data on the second network to a second multimode wireless device.

3. The method of claim 2, wherein the method further comprises the step of receiving a mobile network IP address in response to the request to send data.

4. The method of claim 1, wherein the method further comprises the steps of establishing a data call set up between a first multimode wireless device and the second network and establishing a data call set up between a second multimode wireless device and the second network.

5. The method of claim 4, wherein a mobile network IP address of the second multimode wireless device is obtained and exchanged during the data call set up between the second multimode wireless device and the second network.

6. The method of claim 1, wherein the step of exchanging signals from at least the first network comprises the step of receiving a push-to-send request from a mobile radio to an iDEN network serving as the first network and a CDMA network serving as the second network.

7. The method of claim 1, wherein the step of exchanging signals comprises the step of sending and receiving a push-to-send request from a mobile radio to a CDMA EVDO network serving as the second network and an iDEN network serving as the first network.

8. A system of establishing a rapid push-to-send data exchange in a multi-wireless network environment, comprising:
   a first wireless network having a fast network channel to exchange an Internet Protocol (IP) address or other data;
   a second wireless network operatively coupled to the first wireless network having a high bandwidth data channel to exchange data using the IP address in a wireless peer to peer data transfer; and
   a communication protocol among an originating mobile subscriber unit, a target mobile subscriber unit, the first wireless network, and the second wireless network, wherein the first wireless network and the second wireless network receive a request for a fast paging network connection to transfer the IP address for use by the second wireless network in the wireless peer to peer data transfer, wherein the communication protocol further relinquishes communication using the first wireless network once a dedicated data channel on the second wireless network is established using the high bandwidth data channel and wherein the communication protocol simultaneously transfers voice traffic on the first network when the first network is exchanging the IP address.

9. The system of claim 8, wherein the system further comprises an optional push-to-send server operatively coupled to the first wireless network and the second wireless network that stores the IP address.

10. The system of claim 8, wherein the first wireless network is an iDEN network and the second wireless network is a CDMA network.

11. The system of claim 8, wherein the communication protocol further exchanges setup traffic between the originating mobile subscriber unit and the second network substantially in parallel to when the originating mobile subscriber unit sends a push-to-send or page request to the first network.

12. The system of claim 11, wherein the communication protocol further exchanges setup traffic between the target mobile subscriber unit and the second wireless network immediately after the first wireless network informs the target mobile subscriber of the IP address for the originating mobile subscriber unit.

13. The system of claim 8, wherein the communication protocol further receives setup traffic between the originating mobile subscriber unit and the second wireless network and between the target mobile subscriber unit and the second wireless network substantially simultaneously.

14. A mobile wireless device having a rapid push-to-send data exchange function in a multi-wireless network environment, comprising:
   a first transceiver operating on a first wireless network having a fast network channel to exchange an Internet Protocol (IP) address or other data;
   a second transceiver operating on a second wireless network having a high bandwidth data channel and operatively coupled to the first wireless network to exchange data using the IP address in a wireless peer to peer data transfer; and
   a processor coupled to the first transceiver and the second transceiver, wherein the processor is programmed to:
      exchange signals on the first network to exchange the IP address;
      switch to the second network using the IP address to transfer data in the wireless peer to peer data transfer; and
      simultaneously transferring voice traffic on the first network when the first network is exchanging the IP address;
   wherein the mobile wireless device uses a communication protocol as an originating mobile subscriber unit or a target mobile subscriber unit in conjunction with the first wireless network and the second wireless network, wherein the first wireless network and the second wireless network receive a request for a fast raging network connection to transfer the IP address for use by the second wireless network in the wireless peer to peer data transfer, wherein the communication protocol further relinquishes communication using the first wireless network once a dedicated data channel on the second wireless network is established using the high bandwidth data channel.

15. The mobile wireless device of claim 14, wherein the data transferred on the second network is image, video, sound recording, or multimedia data.

* * * * *